United States Patent
Barten

(10) Patent No.: US 9,529,742 B2
(45) Date of Patent: *Dec. 27, 2016

(54) METHOD OF PROGRAMMING THE DEFAULT INTERFACE SOFTWARE IN AN INDICIA READING DEVICE

(71) Applicant: Hand Held Products, Inc., Fort Mill, SC (US)

(72) Inventor: Henri Barten, Lommel (BE)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/055,662

(22) Filed: Feb. 29, 2016

(65) Prior Publication Data

US 2016/0179705 A1 Jun. 23, 2016

Related U.S. Application Data

(63) Continuation-in-part of application No. 14/724,849, filed on May 29, 2015, now Pat. No. 9,274,806, which is a continuation of application No. 14/515,600, filed on Oct. 16, 2014, now Pat. No. 9,047,098, which is a continuation of application No. 12/578,635, filed on Oct. 14, 2009, now Pat. No. 8,868,802.

(51) Int. Cl.
| | |
|---|---|
| *G06F 13/12* | (2006.01) |
| *G06K 7/10* | (2006.01) |
| *G06F 13/10* | (2006.01) |
| *G06F 13/20* | (2006.01) |
| *G06F 9/44* | (2006.01) |
| *G06K 7/14* | (2006.01) |
| *G06K 7/00* | (2006.01) |

(52) U.S. Cl.
CPC .......... *G06F 13/102* (2013.01); *G06F 9/4401* (2013.01); *G06F 9/4411* (2013.01); *G06F 13/20* (2013.01); *G06K 7/0004* (2013.01); *G06K 7/10851* (2013.01); *G06K 7/10881* (2013.01); *G06K 7/1413* (2013.01); *G06K 2207/1017* (2013.01)

(58) Field of Classification Search
CPC ................................ G06F 17/00; G06K 7/10
USPC ....................................... 710/62; 235/462.14
See application file for complete search history.

(56) References Cited

U.S. PATENT DOCUMENTS

| | | | |
|---|---|---|---|
| 5,424,524 A | 6/1995 | Ruppert et al. | |
| 6,293,467 B1 | 9/2001 | Reddersen et al. | |
| 6,415,978 B1 | 7/2002 | McAllister | |
| 6,612,495 B2 * | 9/2003 | Reddersen | ................ G06F 1/18 |
| | | | 235/462.13 |

(Continued)

FOREIGN PATENT DOCUMENTS

WO 2009064759 5/2009

*Primary Examiner* — Titus Wong
(74) *Attorney, Agent, or Firm* — Additon, Higgins & Pendleton, P.A.

(57) ABSTRACT

An indicia reading apparatus includes an NFC module and an indicia reading device. The indicia reading device is configured so that, if the indicia reader device is not configured to any NFC module and detects an indicia which does not contain one of a plurality of specified sequences of data elements that the indicia reading device will recognize and use to configure itself to operate with the NFC module, the indicia reading device will indicate to the user of the indicia reading device that the indicia reading device needs to be configured to operate with the NFC module.

20 Claims, 12 Drawing Sheets

(56) References Cited

U.S. PATENT DOCUMENTS

| | | |
|---|---|---|
| 6,619,549 B2 | 9/2003 | Zhu et al. |
| 6,707,581 B1 | 3/2004 | Browning |
| 6,719,202 B1 * | 4/2004 | Kawai ............... G06K 17/00 235/383 |
| 6,877,663 B2 | 4/2005 | Kelly et al. |
| 7,044,383 B2 | 5/2006 | Zhu et al. |
| 7,104,456 B2 | 9/2006 | Parker et al. |
| 7,389,918 B2 | 6/2008 | Wike, Jr. et al. |
| 7,438,217 B2 | 10/2008 | Bhella et al. |
| 7,600,691 B2 | 10/2009 | Rathus et al. |
| 7,837,111 B2 | 11/2010 | Yang et al. |
| 8,868,802 B2 | 10/2014 | Barten |
| 9,047,098 B2 | 6/2015 | Barten |
| 9,274,806 B2 | 3/2016 | Barten |
| 2007/0228137 A1 | 10/2007 | Bhella et al. |
| 2008/0228773 A1 | 9/2008 | Stewart et al. |
| 2008/0230607 A1 | 9/2008 | Etten |
| 2008/0307197 A1 | 12/2008 | Calvin et al. |
| 2009/0048870 A1 | 2/2009 | Godshall et al. |
| 2009/0078773 A1 | 3/2009 | Carlson et al. |
| 2009/0108067 A1 | 4/2009 | Roquemore |
| 2009/0200380 A1 | 8/2009 | Longacre, Jr. et al. |
| 2009/0237221 A1 | 9/2009 | Battles et al. |

\* cited by examiner

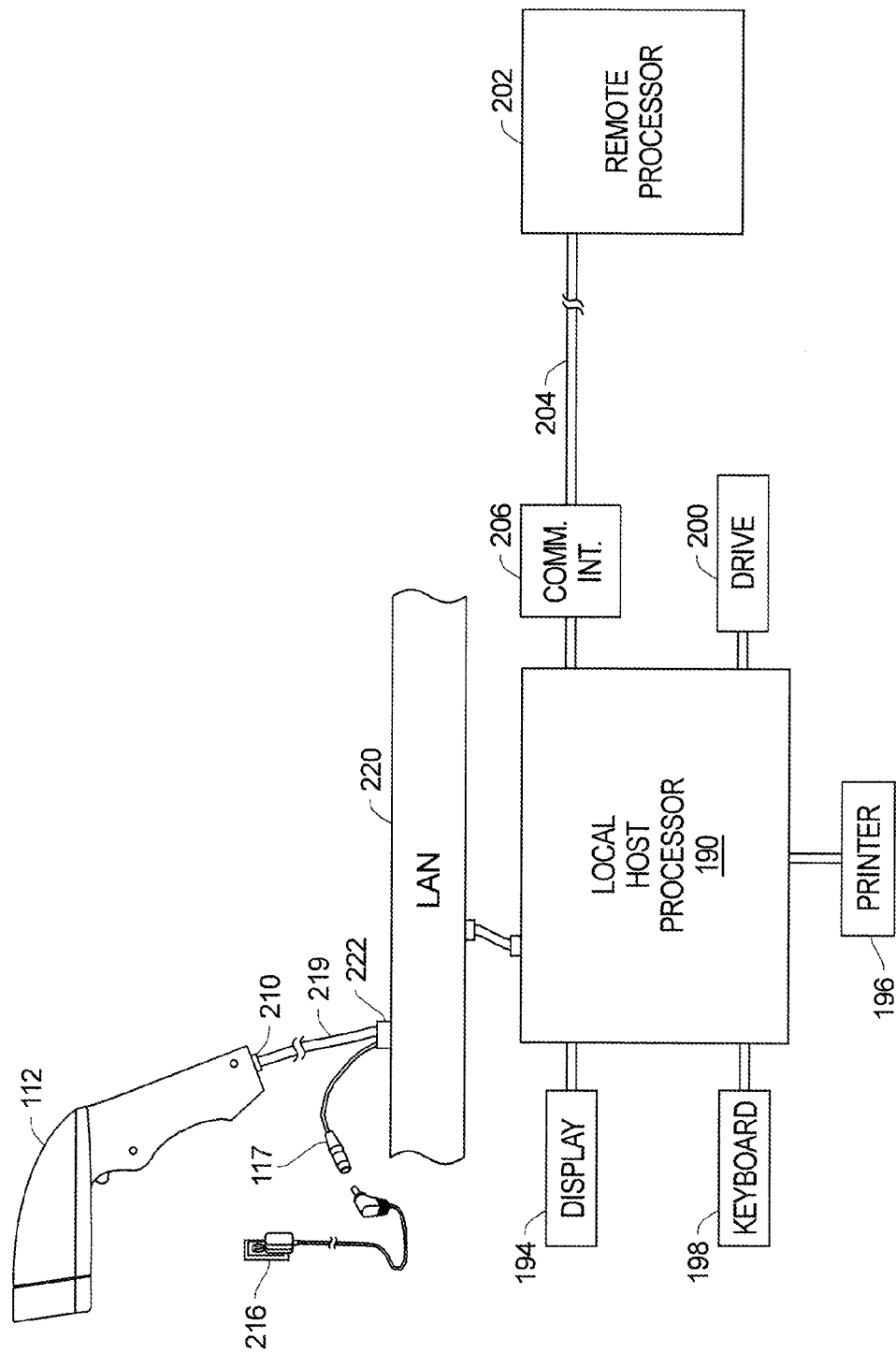

METHOD OF PROGRAMMING THE DEFAULT INTERFACE SOFTWARE IN AN INDICIA READING DEVICE

CROSS-REFERENCE TO RELATED APPLICATIONS

The present application claims the benefit of U.S. patent application Ser. No. 14/724,849 for a Method of Programming the Default Cable Interface Software in an Indicia Reading Device filed May 29, 2015 (and published Sep. 24, 2015 as U.S. Patent Publication No. 2015/0268971), now U.S. Pat. No. 9,274,806, which claims the benefit of U.S. patent application Ser. No. 14/515,600 for a Method of Programming the Default Cable Interface Software in an Indicia Reading Device filed Oct. 16, 2014 (and published Feb. 5, 2015 as U.S. Patent Application Publication No. 2015/0039878), now U.S. Pat. No. 9,047,098, which claims the benefit of U.S. patent application Ser. No. 12/578,635 for a Method of Programming the Default Cable Interface Software in an Indicia Reading Device filed Oct. 14, 2009 (and published Apr. 14, 2011 as U.S. Patent Application Publication No. 2011/0087810), now U.S. Pat. No. 8,868,802. Each of the foregoing patent applications, patent publications, and patents is hereby incorporated by reference in its entirety.

FIELD OF THE INVENTION

This invention relates to indicia reading devices, and more particularly to a method of programming the default cable interface software in an indicia reading device.

BACKGROUND

Indicia reading devices (also referred to as optical indicia readers, scanners, RFID readers, etc.) typically read indicia data represented by printed indicia or data carrier indicia, (also referred to as symbols, symbology, bar codes, RFID tags, etc.). For instance one type of a symbol is an array of rectangular bars and spaces that are arranged in a specific way to represent elements of data in machine readable form. Another type of symbol is encoded as data in an RFID tag. Optical indicia reading devices typically transmit light onto a symbol and receive light scattered and/or reflected back from a bar code symbol. The received light is interpreted by an image processor to extract the data represented by the symbol. Laser indicia reading devices typically utilize transmitted laser light. RFID readers typically activate RFID tags which transmit data symbols to the RFID readers.

One-dimensional (1D) optical bar code readers are characterized by reading data that is encoded along a single axis, in the widths of bars and spaces, so that such symbols can be read from a single scan along that axis, provided that the symbol is imaged with a sufficiently high resolution along that axis.

In order to allow the encoding of larger amounts of data in a single bar code symbol, a number of 1D stacked bar code symbologies have been developed which partition encoded data into multiple rows, each including a respective 1D bar code pattern, all or most all of which must be scanned and decoded, then linked together to form a complete message. Scanning still requires relatively higher resolution in one dimension only, but multiple linear scans are needed to read the whole symbol.

A class of bar code symbologies known as two dimensional (2D) matrix symbologies have been developed which offer orientation-free scanning and greater data densities and capacities than 1D symbologies. 2D matrix codes encode data as dark or light data elements within a regular polygonal matrix, accompanied by graphical finder, orientation, and reference structures.

Conventionally, an indicia reader, whether portable or otherwise, optical or wireless, may include a central processor which directly controls the operations of the various electrical components housed within the indicia reader. For example, the central processor controls detection of keyboard entries, display features, trigger detection, and indicia read and decode functionality.

Efforts regarding such systems have led to continuing developments to improve their versatility, practicality, and efficiency.

SUMMARY

The invention comprises, in one form thereof, an indicia scanning apparatus including an interconnect cable, an indicia reading device configured to provide an indication to a user of the indicia reading device that the indicia reading device needs to be configured to operate with an interconnect cable if the indicia reader device detects an indicia which does not contain a specified sequence of data elements that the indicia reading device will recognize and configure itself to operate with the interconnect cable, and an indicia with, on or in the interconnect cable with the specified sequence of bar data elements.

In still another form, the invention includes a method for requiring a user of an indicia reader device to initially configure the indicia reader device for operating with an interconnect cable. The method comprises the steps of configuring the indicia reader device so that if the indicia reader device detects an indicia which does not contain one of a plurality of specified sequences of data elements that the indicia reading device will recognize and use to configure itself to operate with the interconnect cable, the indicia reading device will indicate to the user of the indicia reading device that the indicia reading device needs to be configured to operate with the interconnect cable, and providing an indicia with an interconnect cable which includes one of the plurality of specified sequences of data elements which is applicable to the interconnect cable.

BRIEF DESCRIPTION OF THE DRAWINGS

The aforementioned and other features, characteristics, advantages, and the invention in general will be better understood from the following more detailed description taken in conjunction with the accompanying drawings, in which:

FIGS. 3A, 3B, 3C, and 3D are block diagrams of typical data processing systems with which the reading device shown in FIG. 1 may be used;

Figure 1:
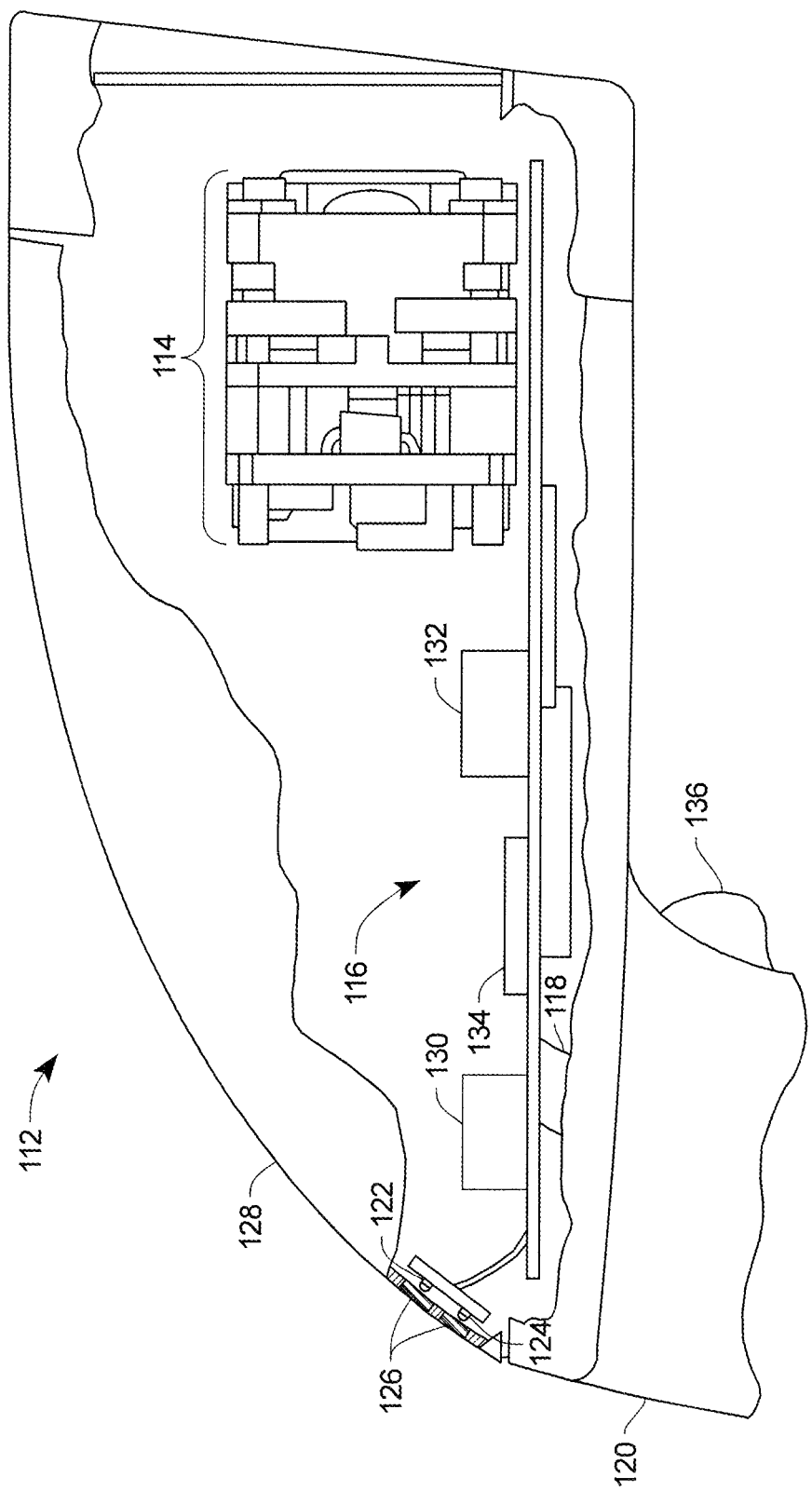
FIG. 1 is a partial cutaway view of an optical indicia reader in accordance with at least one embodiment of the present invention.

It will be appreciated that for purposes of clarity and where deemed appropriate, reference numerals have been repeated in the figures to indicate corresponding features. Also, the relative size of various objects in the drawings has in some cases been distorted to more clearly show the invention.

DETAILED DESCRIPTION

Reference will now be made to exemplary embodiments of the invention which are illustrated in the accompanying drawings. This invention, however, may be embodied in various forms and should not be construed as limited to the embodiments set forth herein. Rather, these representative embodiments are described in detail so that this disclosure will be thorough and complete, and will fully convey the scope, structure, operation, functionality, and potential of applicability of the invention to those skilled in the art.

Referring to FIG. 1, an exemplary hand held indicia reading device or scanner 112 (referred to as "scanner 112") has a number of subsystems for capturing images, interrogating RFID tags, and decoding dataforms within such images and tags. The scanner 112 has an imaging reader assembly 114, an electronics assembly 116, an inner cable 118 from the electronics assembly 116 to a connector (not shown) at the end of a handle 120, and two LEDs, 122 and 124, positioned behind translucent windows 126, and a housing 128 which encloses the electrical parts and is connected to the handle 120. The electronics assembly includes an RFID assembly 130, a vibrator 132, and a sound generator 134. A trigger 136 is used to activate and deactivate the scanner 112. The RFID assembly may be or include a near-field communication (NFC) module.

Figure 2:
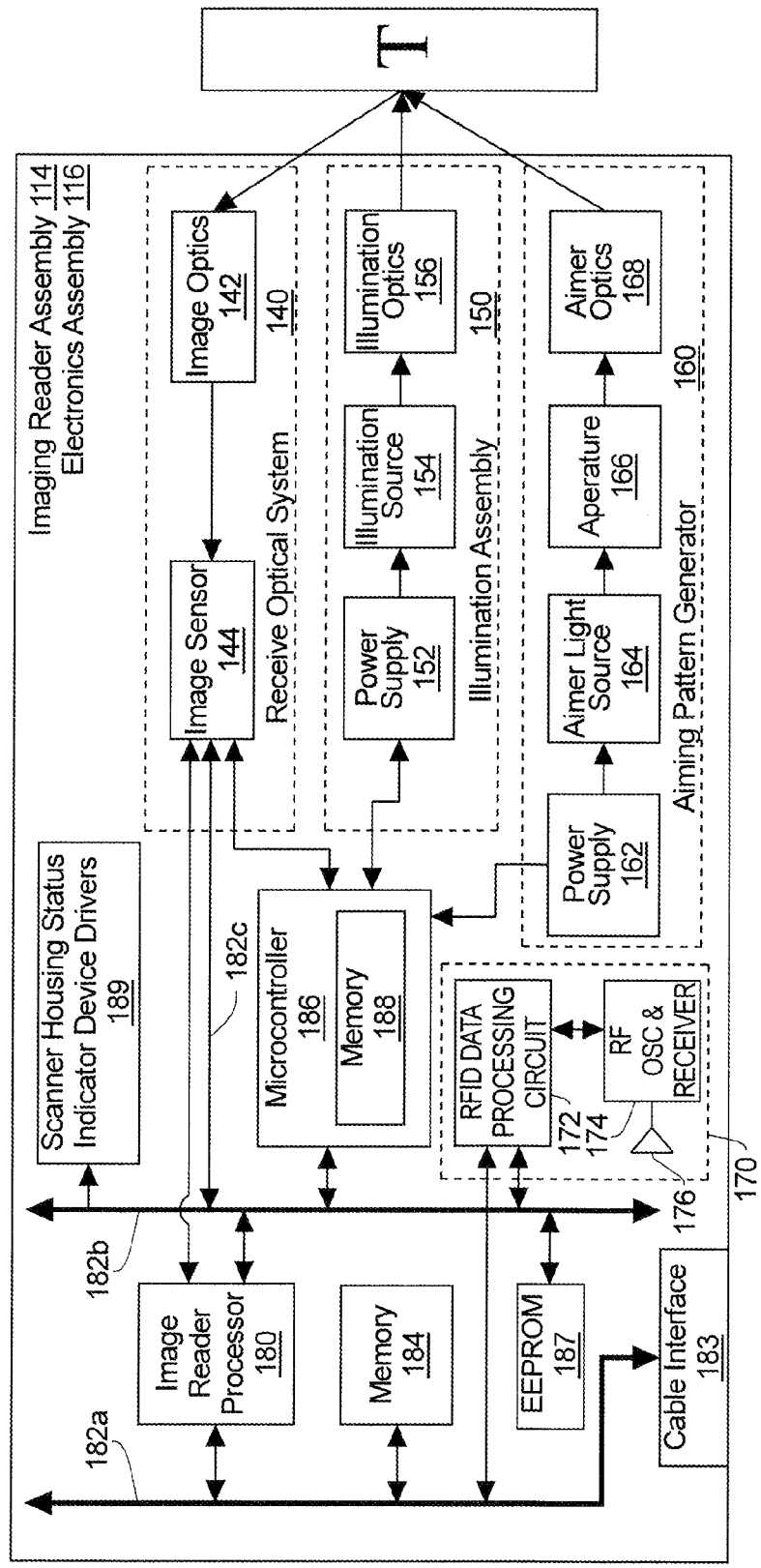
FIG. 2 is a block diagram of the optical indicia reader of FIG. 1.

Referring to FIG. 2, the image reader assembly 114 and electronics assembly 116 generally comprises a receive optical system 140, an illumination assembly 150, an aiming pattern generator 160, an RFID reader unit 170 (e.g., an NFC module), and a variety of control and communication modules. The receive optical system 140 generates frames of data containing indications of the intensity of light received by the read optical system 140. The illumination assembly 150 illuminates a target T creating reflections that are received by the receive optical system 140. The aiming pattern generator 160 projects an aiming light pattern to assist with aiming the scanner 112. While the present description employs an imager based data collection subsystem (the image reader assembly 114 and electronics assembly 116), it is to be recognized that the data collection subsystem may take other forms such as a laser scanner.

The receive optical system 140 generally comprises image receive optics 142 and an image sensor 144. The image optics 142 receives light reflected from a target T and projects the reflected light on to the image sensor 144. The image sensor 144 may comprise any one of a number of two-dimensional, color or monochrome solid state image sensors using such technologies as CCD, CMOS, NMOS, PMOS, CID, CMD, etc. One possible sensor is the MT9V022 sensor from Micron Technology Inc. Such sensors contain an array of light sensitive photodiodes (or pixels) that convert incident light energy into electric charges.

Many image sensors are employed in a full frame (or global) shutter operating mode, wherein the entire imager is reset prior to an image capture operation to remove any residual signal in the photodiodes. The photodiodes (pixels) then accumulate charge for some period of time (exposure period), with the light collection starting and ending at about the same time for all pixels. At the end of the integration period (time during which light is collected), all charges are simultaneously transferred to light shielded areas of the sensor. The light shield prevents further accumulation of charge during the readout process. The signals are then shifted out of the light shielded areas of the sensor and read out. Image sensor 144 may also employ a rolling shutter.

The illumination assembly 150 generally comprises a power supply 152, an illumination source 154, and illumination optics 156. The illumination optics 156 directs the output of the illumination source 154 (generally comprising LEDs or the like) onto the target T. The light is reflected off the target T and received by the receive optical system 140. It is to be noted that the illumination provided by the illumination assembly 150 may be combined with (or replaced by) other sources of illumination, including ambient light from sources outside of the scanner 112.

The aiming pattern generator 160 generally comprises a power supply 162, an aimer light source 164, an aperture 166, and aimer optics 168. The aiming pattern generator 160 creates an aiming light pattern projected on or near the target which spans a portion of the receive optical system's 140 operational field of view with the intent of assisting the operator to properly aim the scanner at the bar code pattern that is to be read. A number of representative generated aiming patterns are possible and not limited to any particular pattern or type of pattern, such as any combination of rectilinear, linear, circular, elliptical, etc., figures, whether continuous or discontinuous, i.e., defined by sets of discrete dots, dashes, and the like. Alternately, the aimer pattern generator may be a laser pattern generator.

Generally, the aimer light source 164 may comprise any light source which is sufficiently small or concise and bright to provide a desired illumination pattern at the target. For example, the aimer light source 164 may comprise one or more LEDs, such as part number NSPG300A made by Nichia Corporation. Illumination and aiming light sources with different colors and combination of colors may be employed, for example white, green and red LEDs. The colors may be chosen based on the color of the symbols most commonly imaged by the image reader. Different colored LEDs may be each alternatively pulsed at a level in accordance with an overall power budget.

The aimer light sources 164 may also be comprised of one or more laser diodes such as those available from Rohm. In this case a laser collimation lens (not shown in these drawings) will focus the laser light to a spot generally forward of the scanning head and approximately at the plane of the target T. This beam may then be imaged through a diffractive interference pattern generating element, such as a holographic element fabricated with a desired pattern in mind. Examples of these types of elements are known, commercially available items and may be purchased, for example, from Digital Optics Corp. of Charlotte, N.C. among others.

Figure 7:
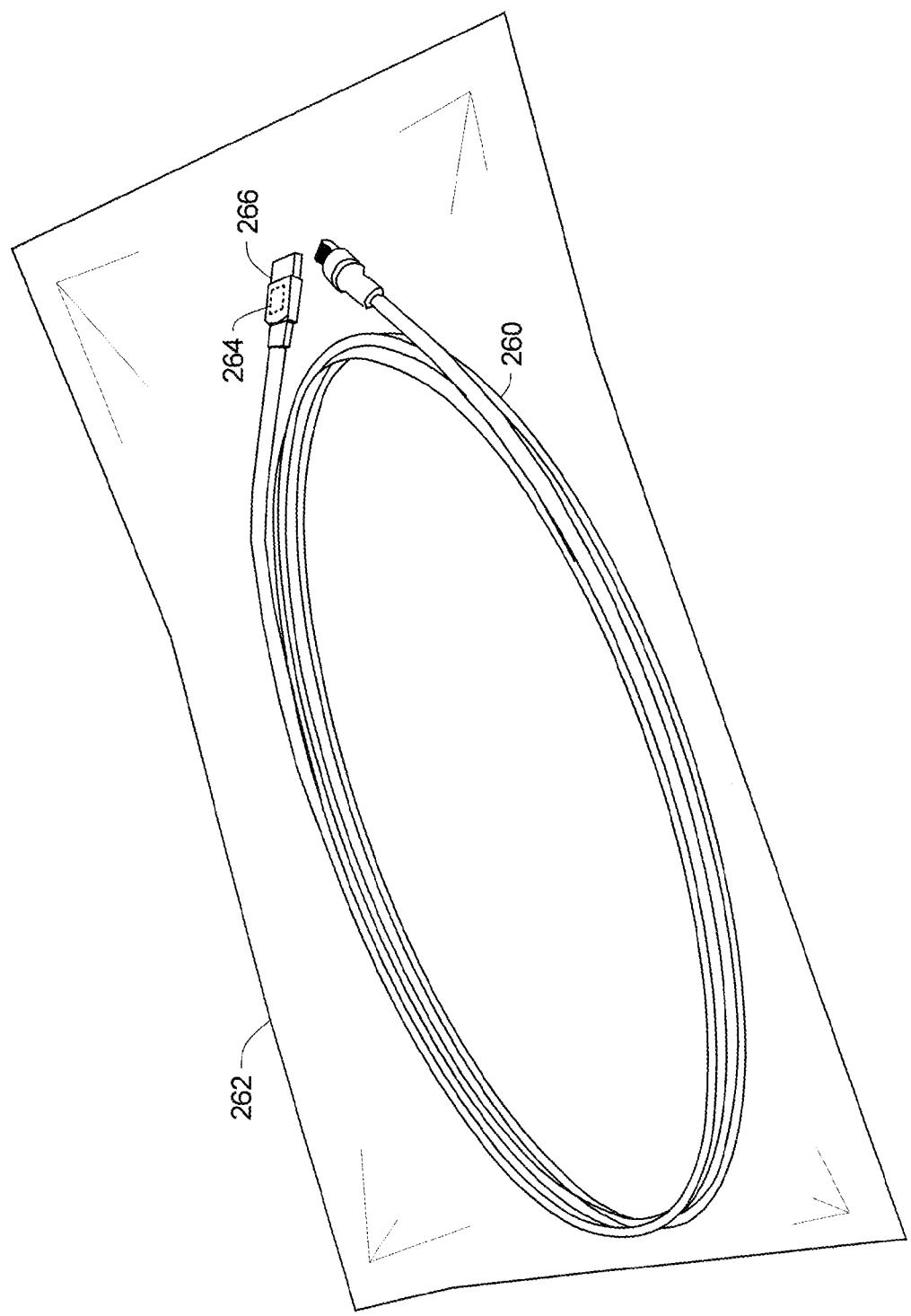
FIG. 7 is a perspective view on an interconnect cable in a plastic bag with an embedded RFID tag for initially configuring the reading device shown in FIG. 1.

The RFID reader unit 170 generally comprises an RFID data processing circuit 172, an RF oscillator and receiver 174, and an RFID antenna 176. The RFID reader unit 170 may be configured to read RF encoded data from a passive RFID tag, such as tag 262 (FIG. 7). Where RFID reader unit 170 is configured to read RF encoded data from a passive RFID tag 262, RF oscillator and receiver circuit 174 transmits a carrier signal from antenna 176 to passive tag 262. Passive RFID tag 262 converts the carrier energy to voltage form and a transponder of tag 262 is actuated to transmit a radio signal representing the encoded tag data. RF oscillator and receiver circuit 174, in turn, receives the radio signal from the tag and converts the data into a digital format. RFID data processing circuit 172, typically including a low cost microcontroller IC chip, decodes the received radio signal information received by RF oscillator and receiver circuit 147 to decode the encoded identification data originally encoded into RFID tag 262. The decoded digital data is passed to bus 182a. As noted, the RFID reader unit/assembly may be or include an NFC module. The NFC module may be configured to read and write data to passive or smart tags. Additionally, the NFC module may be configured to perform card emulation which provides the ability to open a communication channel between a contactless payments terminal and a remotely hosted secure element containing financial payment card data. Stated differently, the NFC module may be configured to perform card emulation by permitting NFC information transfer between a terminal configured to exchange NFC radio information with an NFC card and a mobile device application configured to act or pretend to emulate the functional responses of an NFC card. Furthermore, the NFC module may be configured to provide peer-to-peer information exchange and/or pairing. The NFC module uses magnetic induction between two loop antennas (one loop in the NFC module and one loop in the target (e.g., a tag or other device)) within each other's near field. The NFC module uses RF signals in a passive or active mode to communicate. In the passive mode, the NFC module provides a carrier field and the target device answers by modulating the existing field. In the active mode, the NFC module communicates by activating its field while transmitting data and deactivates its field while waiting for data.

A scanner processor 180 provides overall control of the image reader assembly 114 and electronics assembly 116. The scanner processor 180 and other components of the image reader assembly are generally connected by one or more buses 182n and/or dedicated communication lines. In the illustrated example a parallel bus 182a connects the scanner processor 180 to a cable interface circuit 183 which includes a cable connector and to a main system memory 184 used to store processed (and unprocessed) image data from the image sensor 144. The scanner processor 180 utilizes an I²C bus 182b to communicate exposure settings to the image sensor 144 and illumination parameters to a microcontroller 186. A dedicated 8 to 10 bit parallel bus 182c is used to transfer image data from the image sensor 144 to the scanner processor 180. The width of the bus 182c may be dependent on the bit size recorded by each pixel in the image sensor 144. The output of the image sensor 144 is processed by the scanner processor 180 utilizing one or more functions or algorithms, which may be stored in an EEPROM 187, to condition the signal appropriately for use in further processing downstream, including being digitized to provide a digitized image of target T.

Another function of the scanner processor 180 is to decode machine readable symbology represented within an image captured by the image sensor 144. Information respecting various reference decode algorithms is available from various published standards, such as by the International Standards Organization ("ISO"). The scanner processor 180 also controls the scanner housing status indicator device drivers 189 which drives the LEDs 122 and 124, the vibrator 132, and the sound generator 134.

The microcontroller 186 maintains illumination parameters, used to control operation of the illumination assembly 150 and the aiming pattern generator 160, in a memory 188. For example, the memory 188 may contains tables indicative of power settings for the power supplies 152 and 162 corresponding to various states of the signal from the image sensor 144. Based upon signals from the scanner processor 180 and/or the image sensor 144, the microcontroller 186 sends signals to the power supplies 152 and 162 based on values stored in the table in memory 188. An exemplary microcontroller 150 is the CY8C24223A made by Cypress Semiconductor Corporation.

Figure 3A:
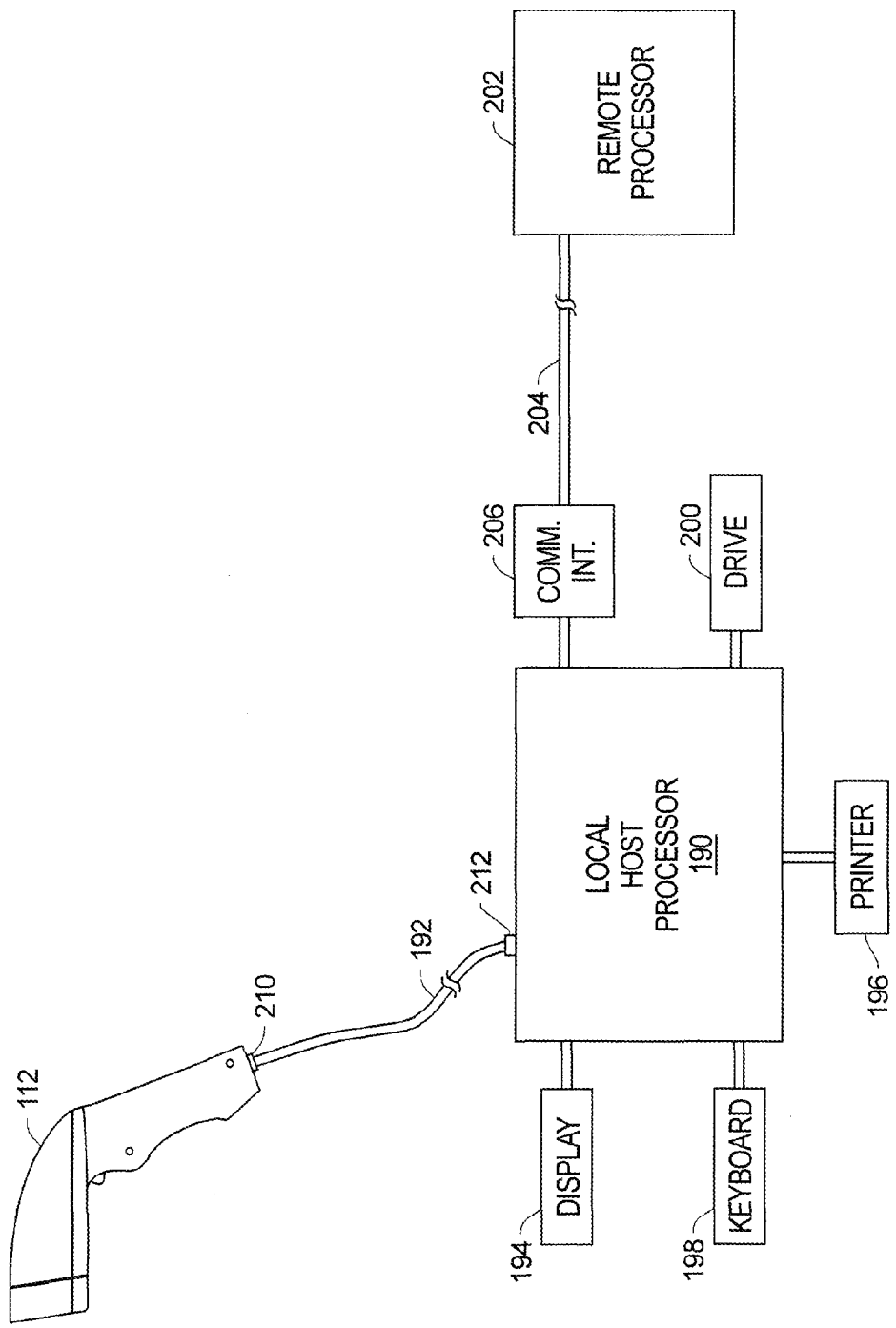

FIGS. 3A, 3B, 3C, and 3D are four block diagrams of exemplary systems with which the scanner 112 may be used. Although the optical scanner 112 is used in the drawings, a wireless or RFID scanner may also be used with the present invention. In FIG. 3A the scanner 112 is coupled to a local host processor 190 by means of an interconnect cable 192, which in FIG. 3A may have a USB connection to the host processor 190. Host processor 190 may be connected to a display 194, to a printer 196, and a keyboard 198. As used herein, the term "local host processor" will be understood to include both stand alone host processors and host processors which comprise only one part of a local computer system. The scanner 112 may also be coupled to the local host processor 190 by means of an NFC module (not shown).

If the software for the scanner 112 is available locally as, for example, on a diskette or CD-ROM, it may be loaded using a suitable drive unit 200. The local host processor 190 may be in communication with a remotely located processor 202 through a suitable transmission link 204, such as an electrical conductor link, a fiber optic link, or a wireless transmission link through a suitable communication interface 206, such as a modem. As used herein, the term "transmission link" will be understood to refer broadly to any type of transmission facility, including an RS-232 capable telephone line, an RF link, or a computer network, e.g., ETHERNET although other types of transmission links or networks may also be used. For example, transmission link 204 could be provided by a coaxial cable or any other non-RF electromagnetic energy communication link including a light energy infrared or microwave communication link. Link 204 could also be an acoustic communications link.

Figure 3B:
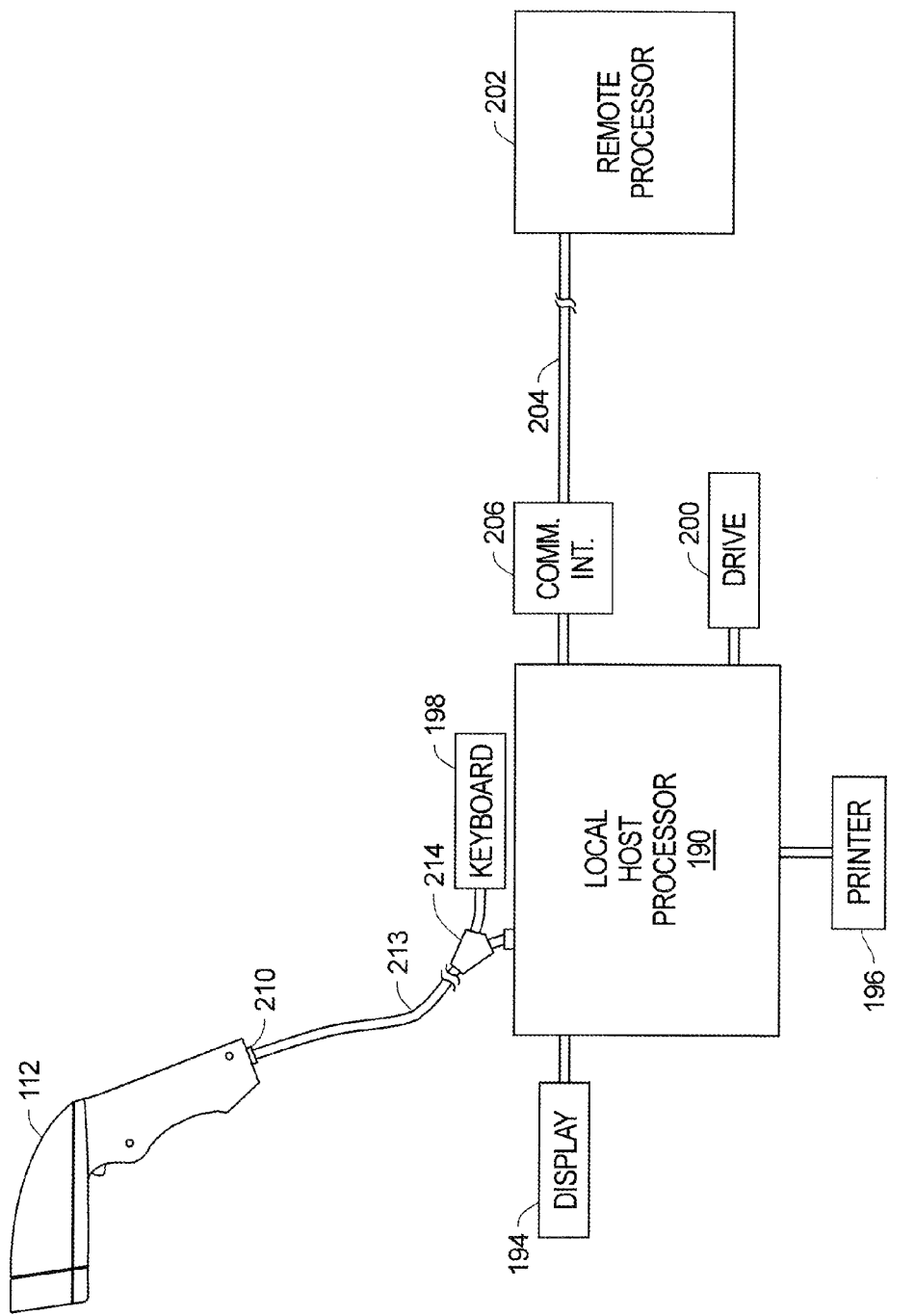
Figure 3C:
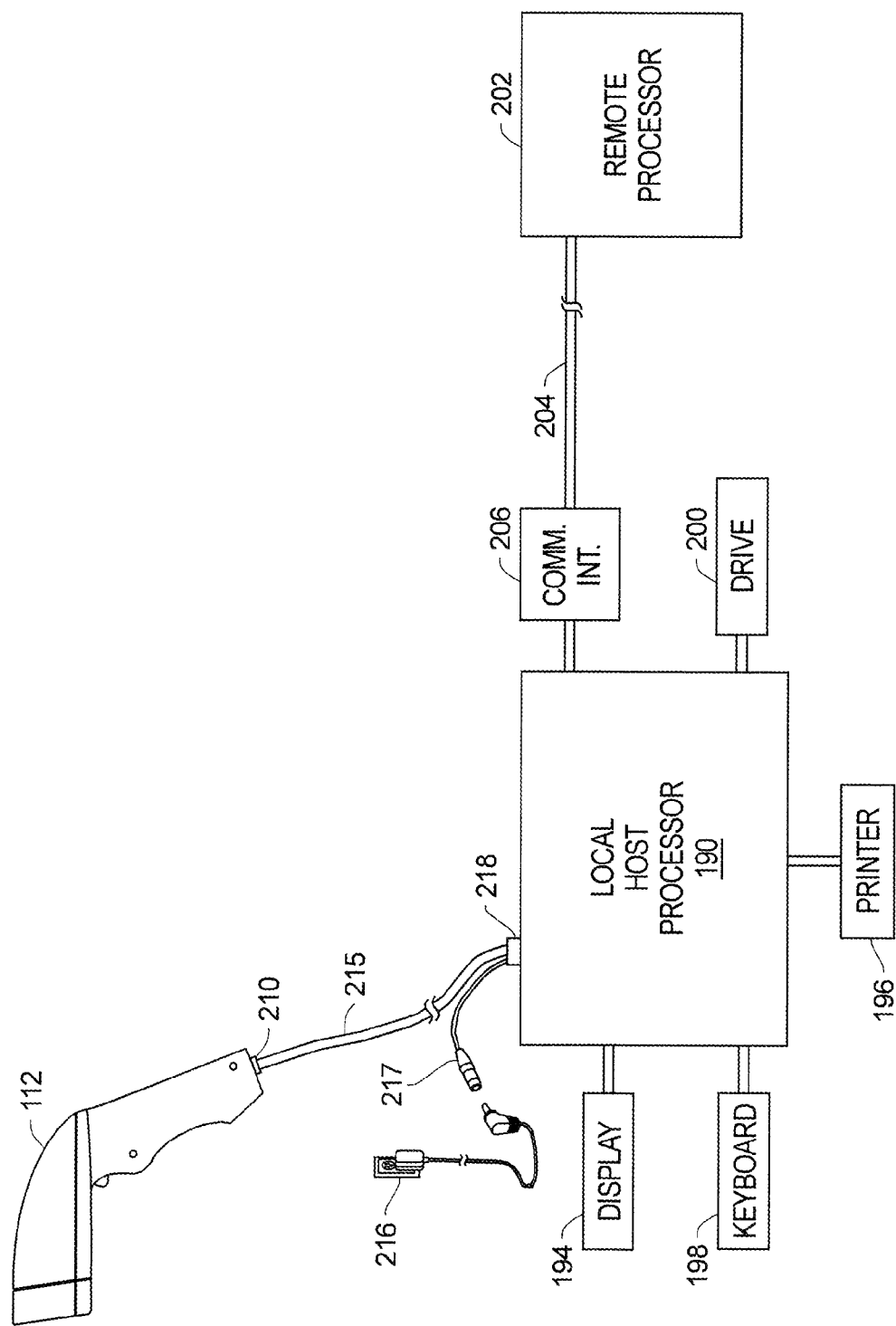

The connection to the host processor 190 must be of a type to provide electrical data between the scanner 112 and the host process 190, and provide power to the scanner 112. A USB connection can perform these functions, as can a keyboard connection. FIG. 3B shows the scanner 112 connected to the host processor 190 by an interconnection cable 213 with a keyboard wedge 214 at one end to permit the use of a keyboard with the scanner 112. In FIG. 3C the scanner 112 is connected to the host processor 190 by an interconnect cable 215 at a connection 218 to the host processor 190 which cannot provide the power needed by the scanner 112. For example, a serial port on the host processor 190 is a connection which cannot power the scanner 112. In FIG. 3C a separate power supply 216 is needed for the scanner 112. The power supply 216 is connected to a power connector 217 which, in turn, is connected to the connector 218 which replaces the connector 212 in FIG. 3A. In FIG. 3D the scanner 112 is connected by an interconnect cable 219 directly to a local area network (LAN) 220, such as an ETHERNET LAN, which is also connected to the local host processor 190. The interconnect cable 219 couples the scanner 112 to the LAN 220 at a LAN connector 222. Power supply 216 connected to a power connector 217 which, in turn, is connected to the LAN connector 222 to provide power to the scanner 112.

In the past scanners may have been preprogrammed to operate with a specific interface cable or NFC module which may be part of a scanner kit. However, in some cases the preprogrammed scanner does not match the interconnect cable or NFC module in the kit. For example, a customer may buy a USB kit, but the scanner is programmed for a keyboard wedge, and consequently the scanner does not work "out of the box." Once connected, the scanner seems to be ready and there is no indication that further setup is required. The problem is that in mass production the manufacturer sometimes does not know in what kit a scanner will end up. Another downside of the preprogrammed scanners is that if the "factory defaults" indicia is scanned, the scanner defaults to the device's default interface, which isn't necessarily the interface the user requires or expects.

Figure 4A:
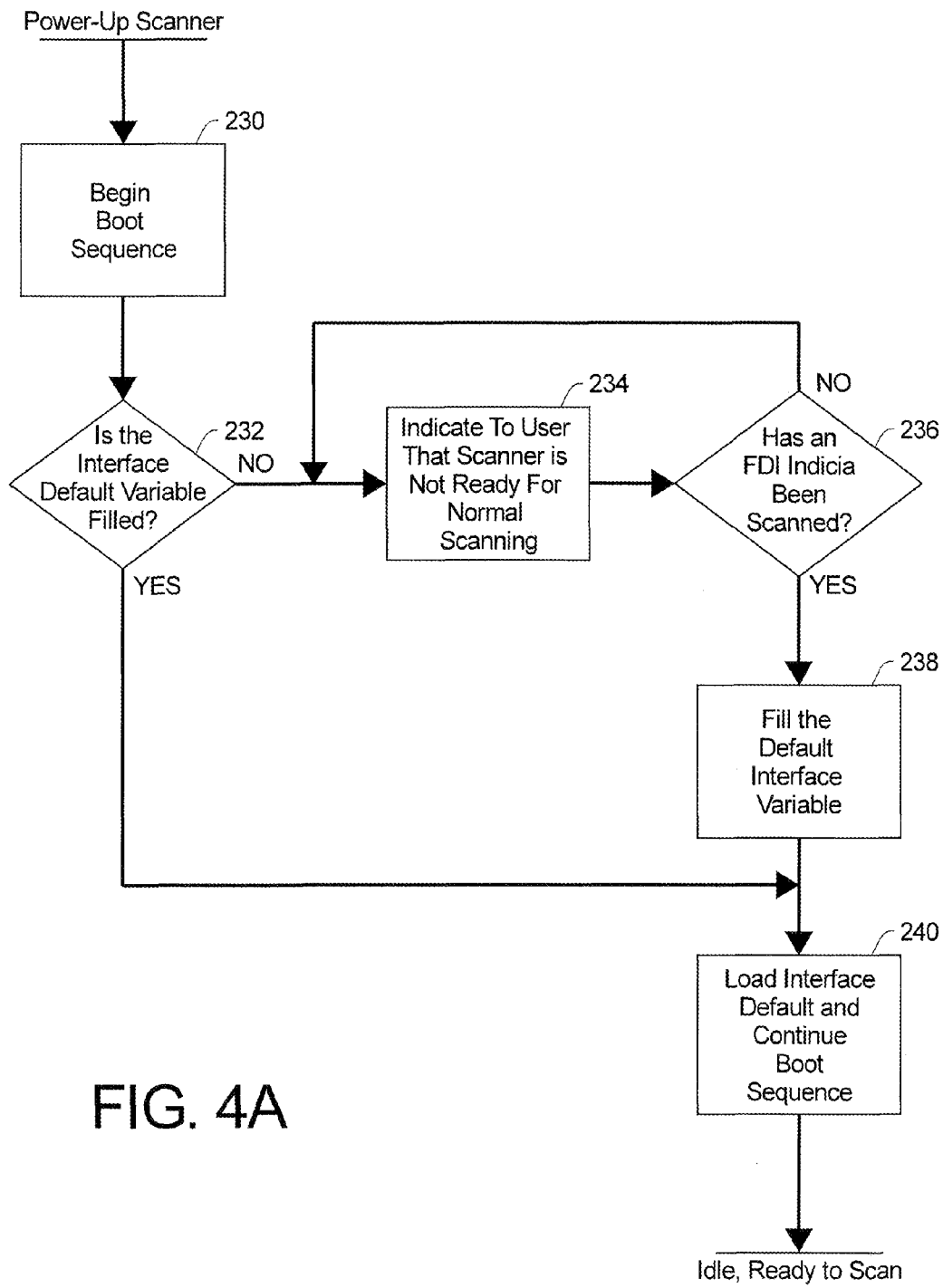
FIGS. 4A and 4B are flow charts of alternate procedures for initially configuring the reading device shown in FIG. 1.
Figure 4B:
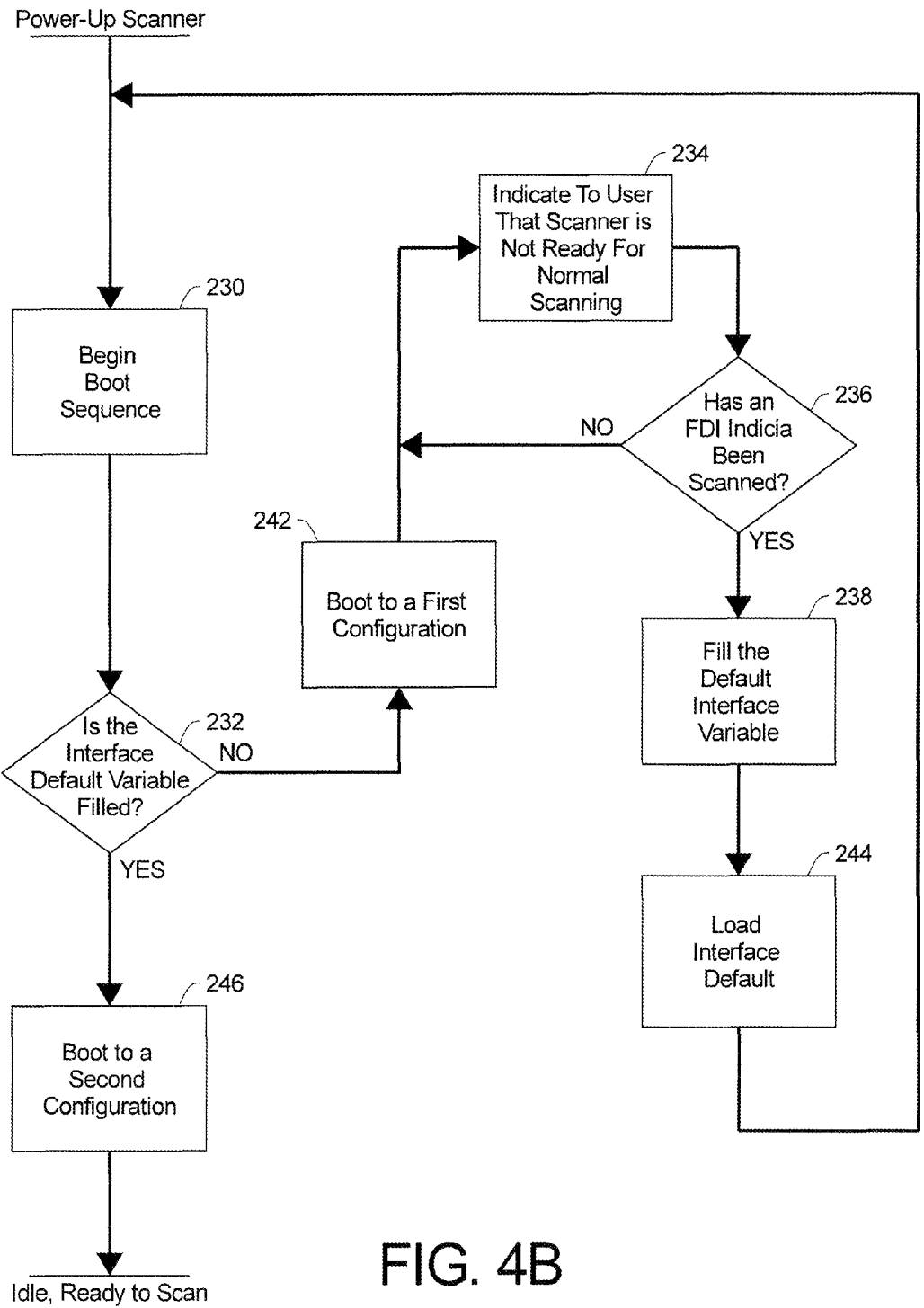

FIGS. 4A and 4B are flow diagrams showing alternate embodiments of the steps used to initially configure the scanner 112 by an end user for a particular type of interconnect cable or NFC module when the scanner 112 is in a "boot mode new" (BMN) mode meaning that an interface default variable has not been set, and there is no interconnection cable and/or NFC module configuration set in the scanner 112. Turning to FIG. 4A, whenever the scanner 112 is powered up while in the BMN mode, an initial boot sequence is performed as indicated in box 230. The boot sequence includes a test of the interface default variable to determine if it is filled as shown in box 232. If the interface default variable has not been filled, the scanner 112 indicates to the user that the variable has not been filled as shown in box 234. The indication may be illumination of one or both of the LEDs 122, 124 shown in FIG. 1, either constantly or intermittently. The indication may also be a sequence of prerecorded sounds generated by the sound generator 134 and/or a movement in the scanner 112 by the vibrator 132. In addition, since the scanner 112 has not completed the boot sequence in the embodiment shown in FIG. 4, the scanner 112 will not be configured to read and interpret product indicia, such as bar codes and RFID tags, or perform any other functions that the scanner is capable of when it has completed the boot sequence. The scanner 112 then waits until a flash default interface (FDI) indicia is received as indicated in box 236. The FDI indicia provides software commands which the scanner 112 uses to configure itself to an interconnect cable and/or NFC module associated with the FDI indicia. After the FDI indicia is detected, the scanner fills the interface default variable as shown in box 238, and resumes the boot sequence including loading the interface default programmed in the FDI indicia as shown in box 240.

In FIG. 4B the scanner 112 begins a boot sequence as indicated by box 230 and then checks to see if the interface default variable is set in box 232. If the interface default variable has not been set, then the scanner 112 continues booting up to a first configuration indicated by box 242 and then signals an operator, either continuously or intermittently, in the manner described above, to scan a FDI indicia as indicated by box 234. While the scanner 112 is signaling the user to scan a FDI indicia, the scanner 112 tests whether a FDI indicia has been scanned in box 236. Once a FDI indicia has been scanned, the interface default variable is filled as indicated in box 238 and the interface default is loaded into the memory of the scanner 112 as indicated in box 244. Then the boot sequence is restarted as indicated in box 230, and whether or not the interface default variable has been set is once more tested as indicated in box 232. Since the interface default variable has been set, the scanner 112 continues booting up to a second configuration as indicated in box 246. At this time the scanner 112 goes into an idle state waiting to scan and attempt to interpret any indicia.

After the initial interconnection cable and/or NFC module configuration has been set, the interconnect cable interface and/or NFC module interface may be changed to allow the scanner 112 to operate with other interface cables and/or NFC modules using programming indicia listed in a user's instruction manual. However, changing the interconnect interface in this manner may not change the interface default variable, and if a master reset indicia is scanned, the interconnect cable interface and/or NFC module interface may revert to the initial interconnection cable configuration and/or NFC module configuration. Thus, if a user sets the default interface variable with a FDI indicia for a USB cable, later changes to an interconnect cable configuration for a keyboard wedge by scanning the indicia for a keyboard wedge interconnect cable in the user's manual, and then later scans a master reset indicia, the scanner 112 may revert back to the USB interconnect cable configuration.

However, the manufacturer may provide a hidden command available to the manufacturer's support personnel to erase the interconnection cable and/or NFC module configuration putting the scanner back into the BMN mode. The user would then have to set the default interface variable using a process such as those shown in FIG. 4A or 4B. By resetting the FDI variable, the scanner 112 would then be ready for sale to a new user or for use in a different location in a company, and the master reset command would not cause an unwanted change in the interface cable and/or NFC module configuration.

The FDI indicia on the cable-bag or NFC-module bag may be a linear (1D) bar code in order to work with a basic scanner 112 which can only read linear (1D) bar codes.

Figure 5:
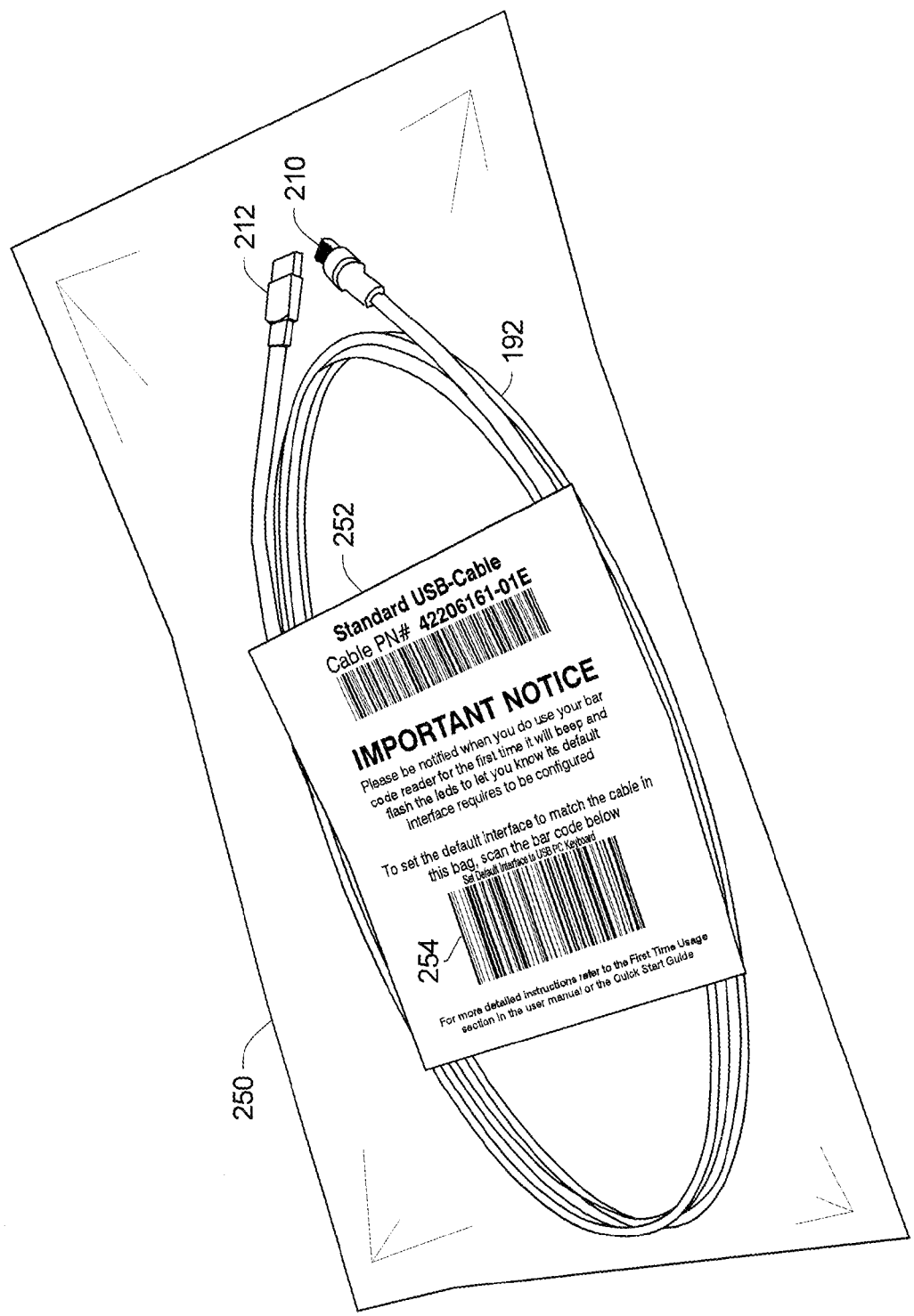
FIG. 5 is a perspective view on an interconnect cable in a plastic bag with a label for initially configuring the reading device shown in FIG. 1.
Figure 6:
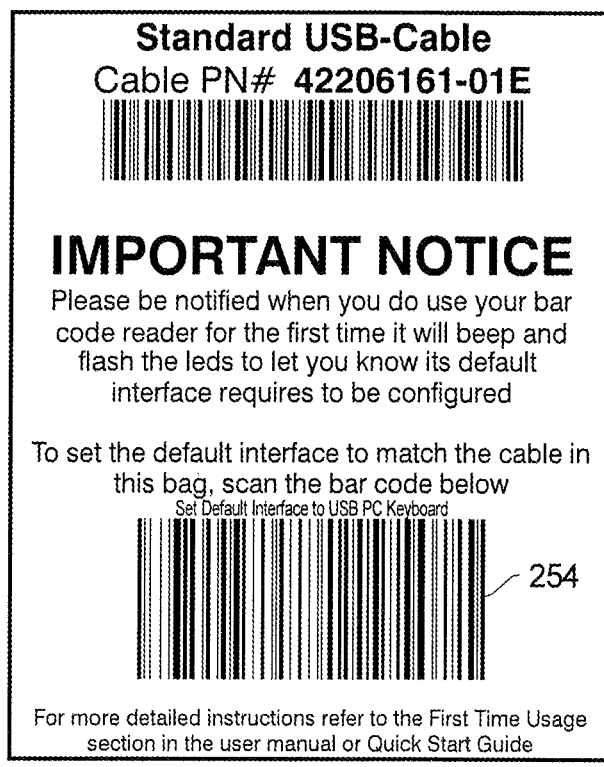
FIG. 6 is an enlarged view of the label shown in FIG. 5.

FIG. 5 is a perspective view of the interconnect cable 192 in a plastic bag 250 with a label 252 with a FDI bar code 254 to be used for initially configuring the scanner 112 so that it is compatible with the cable 192. The label 252 that instructs the user to scan the indicated bar code 254 on the label before trying to use the scanner 112 is shown in FIG. 6.

FIG. 7 is a perspective view of the interconnect cable 260 in a plastic bag 262, similar to that shown in FIG. 5, with a RFID tag 264 embedded in a connector 266 of the cable 260 which can be used for initially configuring the scanner 112 so that it is compatible with the cable 260.

Figure 8:
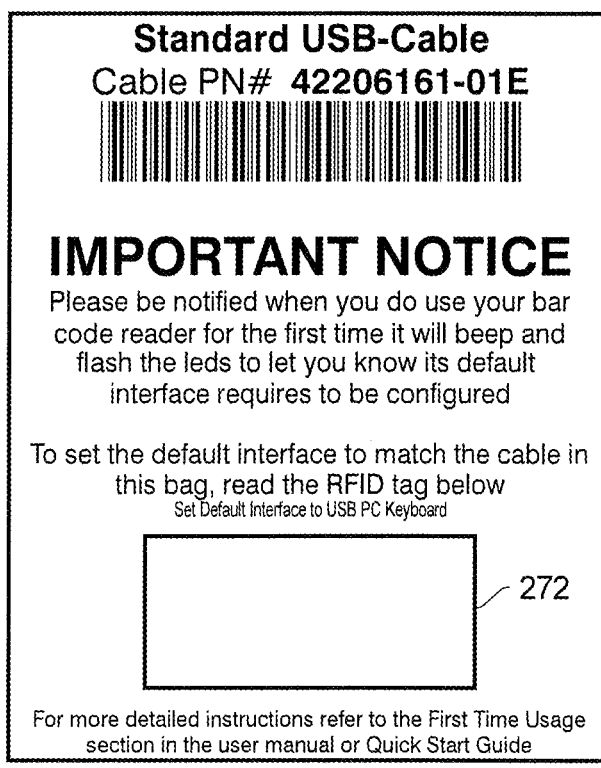
FIG. 8 is an enlarged view of a label for a bag containing an interconnect cable which includes a RFID tag in the label.

FIG. 8 shows a label 270 which includes a RFID tag 272 and can be placed on the plastic bag 262 for an interconnect cable which may not have an imbedded RFID tag in the interconnect cable. The label 270 may be used with interconnect cables, such as an USB interconnect cable, which is used with scanners 112 which have different interface configurations. However, there may be some cables which are used only with scanners with the same designated cable interface, and the embedded RFID tag could be used.

The RFID tags 264 and 272 are FDI RFID tags in that they are used to initially configure the interconnect cables 260 and 272. Because the RFID tag 264 embedded in the cable connector 266 may respond to the RFID reader in the scanner 112 after it has been configured and will therefore broadcast its data, the FDI RFID tags 264, 272 may be encoded to transmit an Application Family Identifier (AFI) which is different from the AFI of other RFID tags that are not used to configure the cable interface of the scanner 112. The RFID reader in the scanner 112 would therefore recognize the AFI of transmitted signal from each RFID tag responding to the RFID reader, and ignore FDI RFID tags unless the scanner 112 does not have a configured cable interface or the scanner 112 has been programmed to receive a new default cable interface from an FDI RFID tag.

While the invention has been described with reference to particular embodiments, it will be understood by those skilled in the art that various changes may be made and equivalents may be substituted for elements thereof without departing from the scope of the invention. In addition, many modifications may be made to adapt a particular situation or material to the teachings of the invention without departing from the scope of the invention.

Therefore, it is intended that the invention not be limited to the particular embodiments disclosed as the best mode contemplated for carrying out this invention, but that the invention will include all embodiments falling within the scope and spirit of the appended claims.

The invention claimed is:

1. A method, comprising:
configuring an indicia reading device with factory defaults, the indicia reading device having various functionalities including a reading functionality;
executing, with the indicia reading device, an initial boot sequence comprising determining whether an interface default variable is present, wherein if the indicia reading device does not contain one of a plurality of specified sequences of data elements, the indicia reading device will recognize a factory default NFC module;
in response to the boot sequence executing and determining that the interface default variable is not present, indicating, with the indicia reading device, to a user that the indicia reading device needs to be configured to operate with a recognized NFC module;
disabling a functionality of the indicia reading device until the indicia reading device receives a specified sequence of data elements applicable to the factory default NFC module;
receiving, with the indicia reading device, a specified sequence of data elements; and
restoring, with the indicia reading device, the disabled functionality.

2. The method of claim 1, comprising:
setting the interface variable to a first state prior to delivering the indicia reading device to a user; and
setting the interface variable to a second state in response to the indicia reading device detecting an indicia which contains one of the plurality of specified sequences.

3. The method of claim 2, wherein the indicia reading device is configured to read indicia if the interface variable is in the first state during the boot sequence.

4. The method claim 1, comprising resetting the interface variable in response to the indicia reading device reading an indicia that contains a reset interface variable program or receiving a reset interface command via an already established interface connection.

5. The method of claim 4, wherein the reset interface variable program comprises data elements that are not available to primary users of the indicia reading device.

6. The method of claim 2, wherein a reset to factory defaults program causes the indicia reading device to configure itself to operate with the NFC module associated with the indicia previously read or received which last set the interface variable to the second state.

7. The method of claim 2, wherein one of the plurality of specified sequences is a linear bar code.

8. The method of claim 2, wherein the indicia reading device boots to a first configuration when the interface variable is in the first state, and boots to a second configuration when the interface variable is in the second state.

9. A method, comprising:
setting an interface variable of an indicia reader to a first status before shipping the indicia reader to a user, wherein setting the interface variable renders the indicia reader inoperable to read indicia that is not one of a plurality of interface configuration indicia; and
providing an NFC module with an indicia comprising one of the plurality of interface configuration data elements before shipping the NFC module to the user;
wherein the indicia reader is configured for executing an initial boot sequence comprising determining whether an interface variable is present;
wherein the indicia reader is configured for setting the interface variable to a second status in response to reading one of the plurality of interface configuration data elements if the indicia reader needs to be configured to operate with the NFC module based on the determination of whether an interface variable is present; and
wherein the indicia reader is configured for, during the initial boot sequence, electronically indicating to a user of the indicia reader that the indicia reader needs to be configured to operate with the NFC module.

10. The method of claim 9, comprising resetting the interface variable to the first status after the interface variable has been set to the second status.

11. The method of claim 9, wherein the indication to the user comprises illumination of a light emitting diode, a sequence of sounds generated by a sound generator, and/or movement of the indicia reader by a vibrator.

12. An indicia reading device, comprising:
a data collection subsystem; and
a processor configured for:
executing an initial boot sequence comprising detecting the presence or absence of an interface default variable;
if the absence of an interface default variable is detected, providing an indication to a user of the indicia reading device that the indicia reading device is not configured to operate with any NFC module;
if the absence of an interface default variable is detected, shifting the indicia reading device to a lower functional state;
reading a specified sequence of data elements on an NFC module;
in response to reading the specified sequence of data elements, populating the interface default variable such that the indicia reading device operates with the NFC module; and
in response to populating the interface default variable, restoring the indicia reading device to a normal functional state.

13. The indicia reading device of claim 12, wherein:
the interface default variable is set to a first state prior to delivering the indicia reading device to a user; and
the processor is configured for detecting a data carrier comprising a specified sequence of data elements and, in response to detecting the data carrier comprising the specified sequence of data elements, setting the interface default variable to a second state.

14. The indicia reading device of claim 12, wherein the processor is configured for reading a linear bar code when the indicia reading device is in the lower functional state.

15. The indicia reading device of claim 12, wherein the processor is configured for:
   reading a reset interface variable program data carrier; and
   in response to reading the reset interface variable program data carrier, resetting the interface default variable.

16. The indicia reading device of claim 12, wherein a reset to factory defaults program causes the indicia reading device to configure itself to operate with the NFC module associated with the indicia previously read which last set the interface variable to the second state.

17. The indicia reading device of claim 12, wherein the specified sequence of data elements is a linear bar code.

18. The indicia reading device of claim 12, wherein the processor is configured for:
   if the absence of an interface default variable is detected, booting to a first configuration; and
   if the presence of an interface default variable is detected, booting to a second configuration.

19. The indicia reading device of claim 12, wherein the indication comprises illumination of a light emitting diode, a sequence of sounds generated by a sound generator, and/or movement of the indicia reading device by a vibrator.

20. The indicia reading device of claim 12, wherein the normal functional state comprises the processor being configured for reading and interpreting product indicia.

* * * * *